US 6,533,298 B2

(12) United States Patent
Sims

(10) Patent No.: US 6,533,298 B2
(45) Date of Patent: Mar. 18, 2003

(54) BEACH CARRYING DEVICE

(76) Inventor: Charles S. Sims, P.O. Box 103, Osyka, MS (US) 39657

( * ) Notice: Subject to any disclaimer, the term of this patent is extended or adjusted under 35 U.S.C. 154(b) by 0 days.

(21) Appl. No.: 09/803,871

(22) Filed: Mar. 12, 2001

(65) Prior Publication Data
US 2002/0125668 A1 Sep. 12, 2002

(51) Int. Cl.[7] .................................................. B62B 1/00
(52) U.S. Cl. .............................. 280/47.26; 280/47.18; 206/386
(58) Field of Search ......................... 280/47.26, 47.18, 280/47.19, 28, 30, 28.17, 47.17, 8; 206/386, 600; 108/55.3

(56) References Cited

U.S. PATENT DOCUMENTS

| 329,145 | A |   | 10/1885 | Dexter | 280/8 |
|---|---|---|---|---|---|
| 1,357,117 | A |   | 10/1920 | Rhodes | 280/8 |
| 3,046,031 | A |   | 7/1962 | Reynolds | 280/8 |
| 4,015,715 | A | * | 4/1977 | Kelf | 206/521 |
| 4,765,252 | A | * | 8/1988 | Shuert | 108/55.1 |
| 4,863,075 | A | * | 9/1989 | Romer | 222/610 |
| D327,756 | S | * | 7/1992 | Klein et al. | 280/47.26 |
| 5,163,694 | A | * | 11/1992 | Reichek | 280/47.26 |
| 5,197,601 | A | * | 3/1993 | Sterett | 206/511 |
| 5,222,748 | A |   | 6/1993 | Johnson | 280/8 |
| 5,259,215 | A | * | 11/1993 | Rocca | 62/371 |
| 5,328,192 | A |   | 7/1994 | Thompson | 280/47.24 |
| 5,380,022 | A |   | 1/1995 | Dennis | 280/47.35 |
| 5,398,832 | A | * | 3/1995 | Clive-Smith | 220/1.5 |
| 5,620,191 | A |   | 4/1997 | Sayette | 280/13 |
| 5,857,695 | A | * | 1/1999 | Crowell | 280/651 |
| 5,876,047 | A |   | 3/1999 | Dennis | 280/47.35 |
| 5,897,131 | A | * | 4/1999 | Brown et al. | 280/7.12 |
| 5,911,422 | A |   | 6/1999 | Carpenter et al. | 280/8 |
| 6,113,129 | A | * | 9/2000 | Marques et al. | 280/654 |
| 6,131,925 | A | * | 10/2000 | Weldon | 280/30 |

FOREIGN PATENT DOCUMENTS

WO    WO 97/12797    4/1997

* cited by examiner

Primary Examiner—Paul N. Dickson
Assistant Examiner—Laura B. Rosenberg
(74) Attorney, Agent, or Firm—David L. Ray

(57) ABSTRACT

A carrying device for transporting items over hard surfaces and soft surfaces including a carrier body having a top surface and a bottom surface, the carrier body having a recessed portion in the top surface thereof, the recessed portion having a plurality of tabs extending inwardly therefrom, a storage container adapted for placement in the recessed portion, the storage container having elongated slots therein for receipt of the tabs in the elongated slots to secure the containers to the carrier body, and at least two wheels connected to the carrier body for rolling the carrier body over hard surfaces.

11 Claims, 6 Drawing Sheets

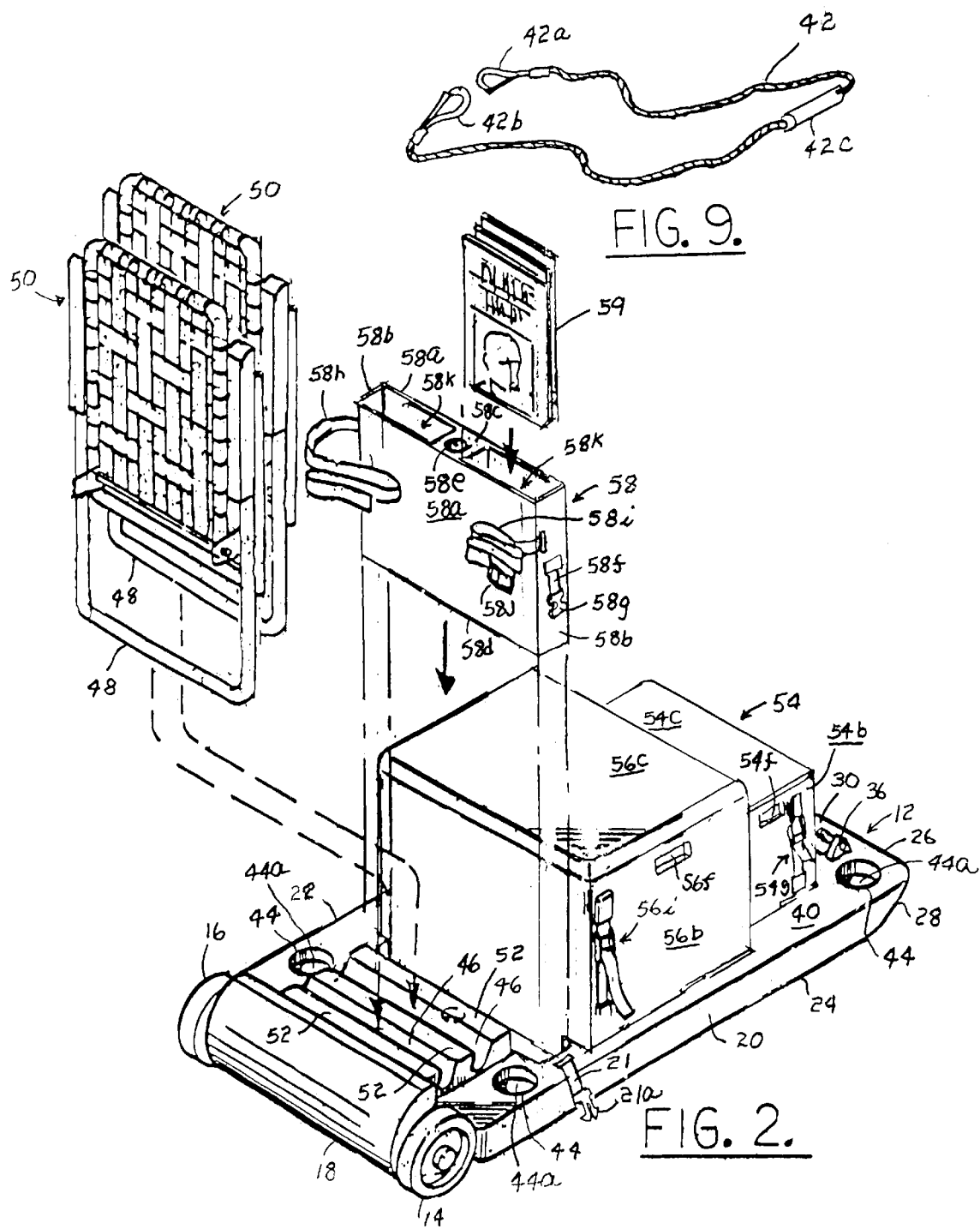

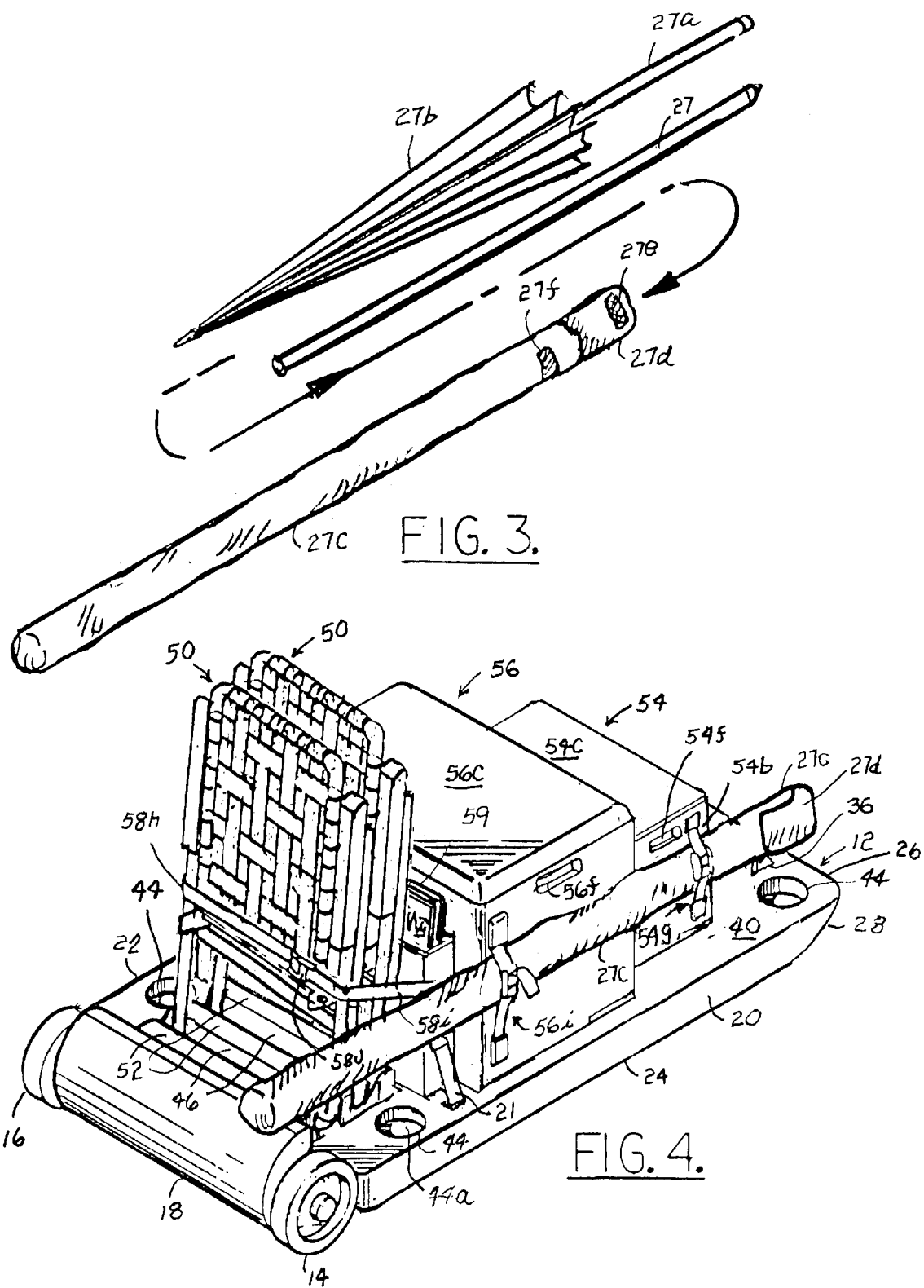

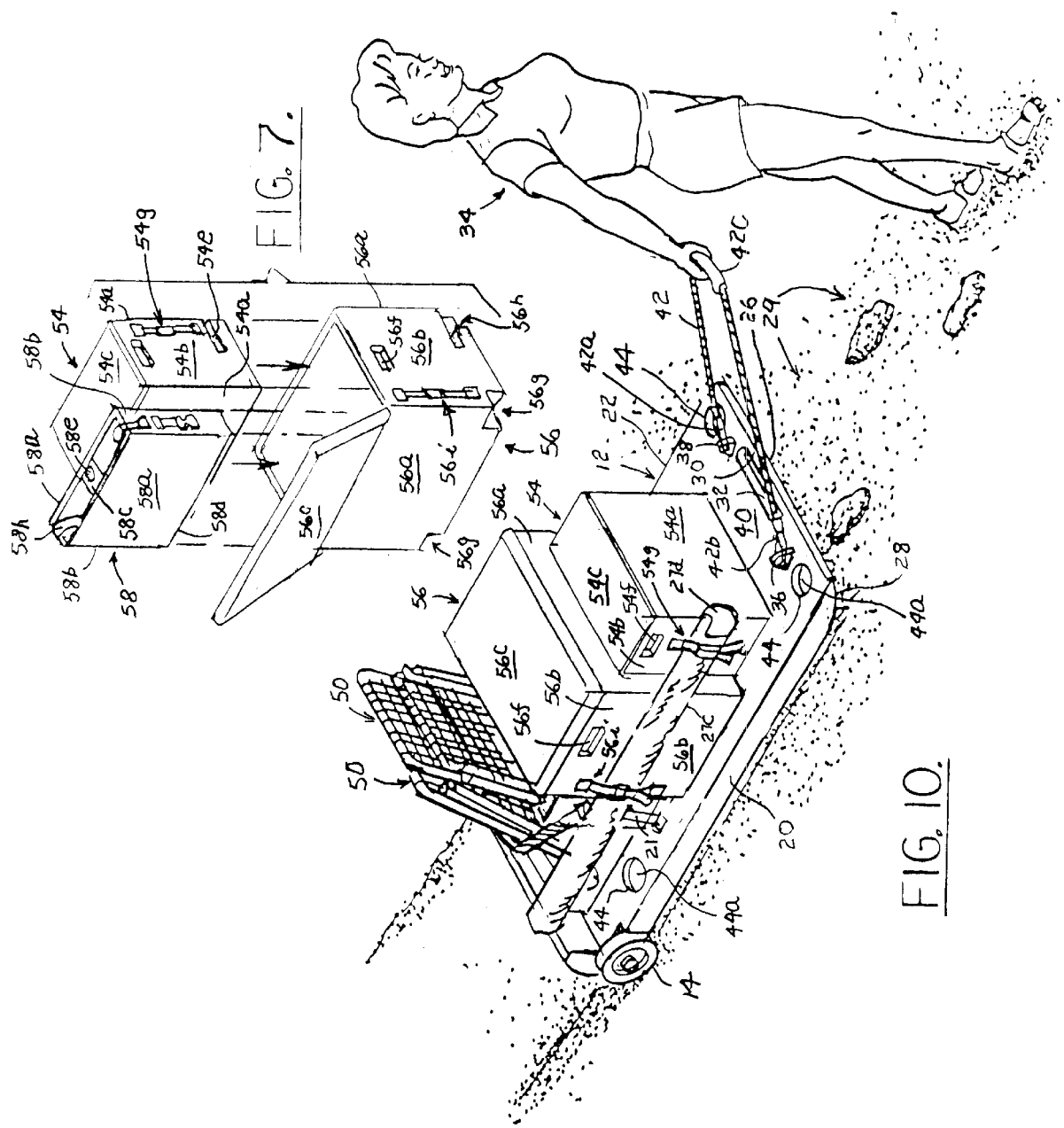

BEACH CARRYING DEVICE

BACKGROUND OF THE INVENTION

1. Field of the Invention

The present invention relates to devices for carrying equipment on soft and uneven terrain. More particularly, the present invention is related to a device for carrying equipment and supplies used by sunbathers on a beach.

2. Description of the Related Art

Sunbathers and swimmers on beaches have long encountered difficulty carrying the items needed to enjoy their day at the beach. Commonly beach users have to walk a great distance from their vehicle to the area on the beach on which they select to sunbathe and swim. Beach users usually must make many trips between the beach and their vehicle to transport an ice chest, umbrella, chairs, magazines or books, and food items to their selected location on the beach.

Devices for carrying items over soft and uneven terrain are known in the art. Exemplary of the related art are U.S. Pat. Nos. 329,145; 1,357,117; 3,046,031; 5,222,748; 5,328,192; 5,380,022; 5,620,191; 5,857,695; 5,876,047; 5,911,422; and World Intellectual Property Organization International Publication Number WO 97/12797 published under the PCT.

However, none of the carrying devices of the prior art have the utility and advantages of the carrying device of the present invention.

SUMMARY OF THE INVENTION

In accordance with the present invention there is provided a carrying device for transporting numerous items that sunbathers, swimmers or other persons visiting a beach may deem necessary for their individual or family outings. The beach carrying device of the invention can be towed across hard surfaces such as pavement or sidewalks or towed across other surfaces such as grass, sand and the like when rolling proves to be difficult. The beach carrying device of the invention includes a rigid carrier body having a flat, planar bottom surface for sliding across sand and wheels connected thereto for towing on hard surfaces such as sidewalks and pavement. The rigid carrier body has a recessed portion in the top surface thereof for receipt of one or more storage containers. The containers preferably include a cold storage container, a dry goods container and an umbrella and magazine container. The recessed portion in the carrier body has tabs therein for receipt in slots in a container the storage containers on the carrier body. The umbrella and magazine container may also fit in the recessed portion of the carrier body and may be connected thereto by a strap connected to the carrier body. The carrier body of the invention preferably has a plurality of elongated slots therein for receipt of conventional lawn chairs.

The present invention has the advantage of enabling a beach user to easily transport the items needed for enjoying a day at the beach in a single trip.

The present invention has the additional advantage of being easily towed by the beach user over hard surfaces such as a sidewalk and over soft and uneven surfaces such as a sandy beach.

BRIEF DESCRIPTION OF THE DRAWINGS

FIG. 2 is a partly exploded view of the beach carrying device of the invention illustrating the alignment and attachment of an umbrella and magazine container and lawn chairs to the body of the beach carrying device of the invention;

FIG. 3 is a perspective view of an umbrella and umbrella case which may be utilized with the beach carrying device of the invention;

FIG. 4 is a perspective assembly view of the beach carrying device of the invention having lawn chairs, an umbrella, a cold storage container, a dry storage container, and an umbrella and magazine container connected thereto;

FIG. 7 is a exploded view of the containers used with the beach carrying device of the invention showing a dry storage container and a magazine and umbrella container aligned with a cold storage container for storage within the cold storage container;

FIG. 9 is a perspective view of a tow rope used to tow the beach carrying device of the invention; and FIG. 10 is a perspective view showing the beach carrying device of the invention being towed across a beach.

DESCRIPTION OF THE PREFERRED EMBODIMENTS

Figure 1:
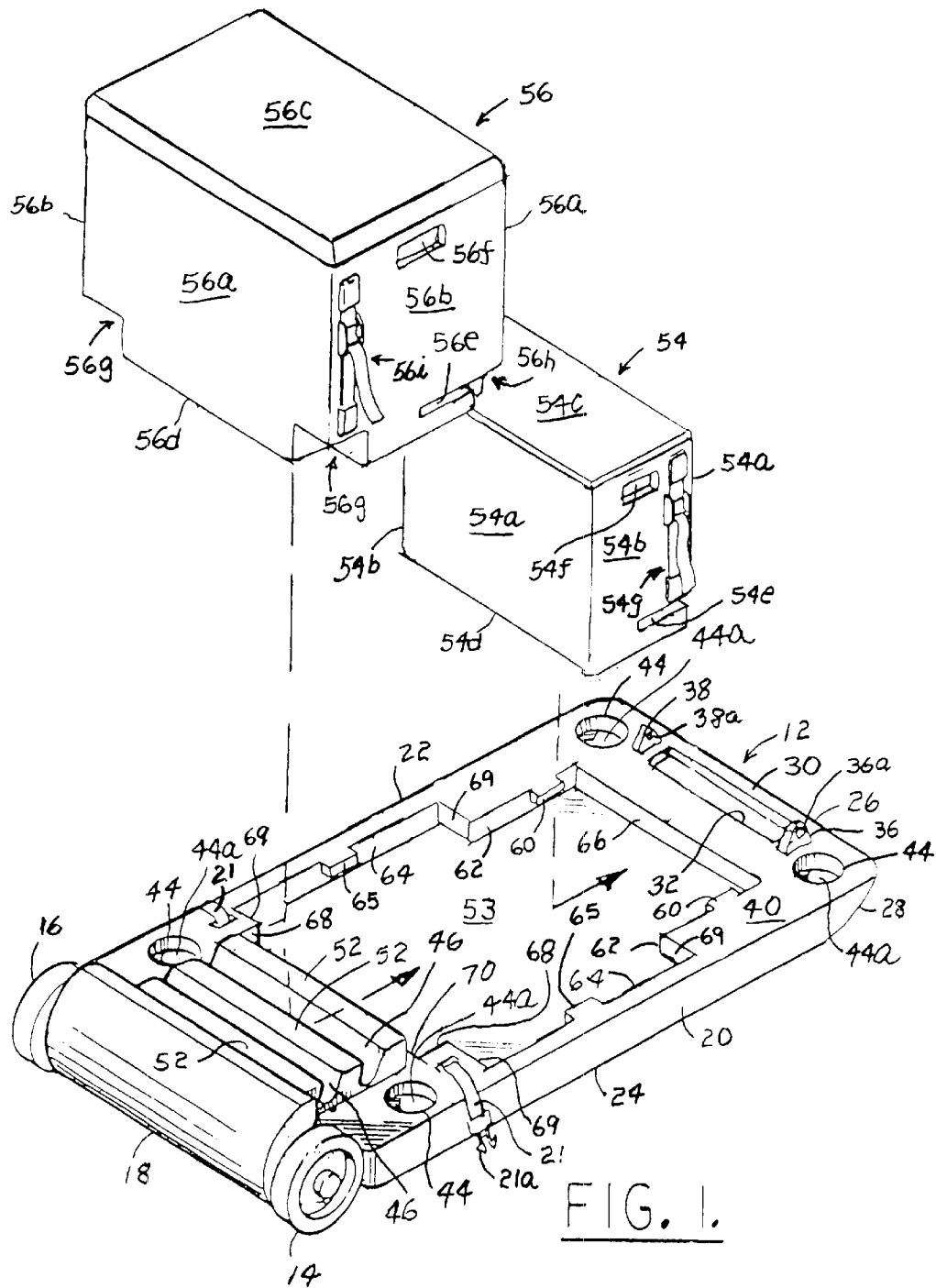
FIG. 1 is a perspective view, partly exploded, of the beach carrying device of the invention illustrating the manner in which a cold storage container and dry storage container may be connected to the carrier body of the beach carrying device of the invention.

Referring now to the drawings, and in particular to FIG. 1, the beach carrying device of the invention can be seen to include a rigid carrier body generally indicated by the numeral 12. Carrier body 12 is generally rectangular in shape and has two wheels 14 and 16 rotatably connected thereto.

Figure 8:
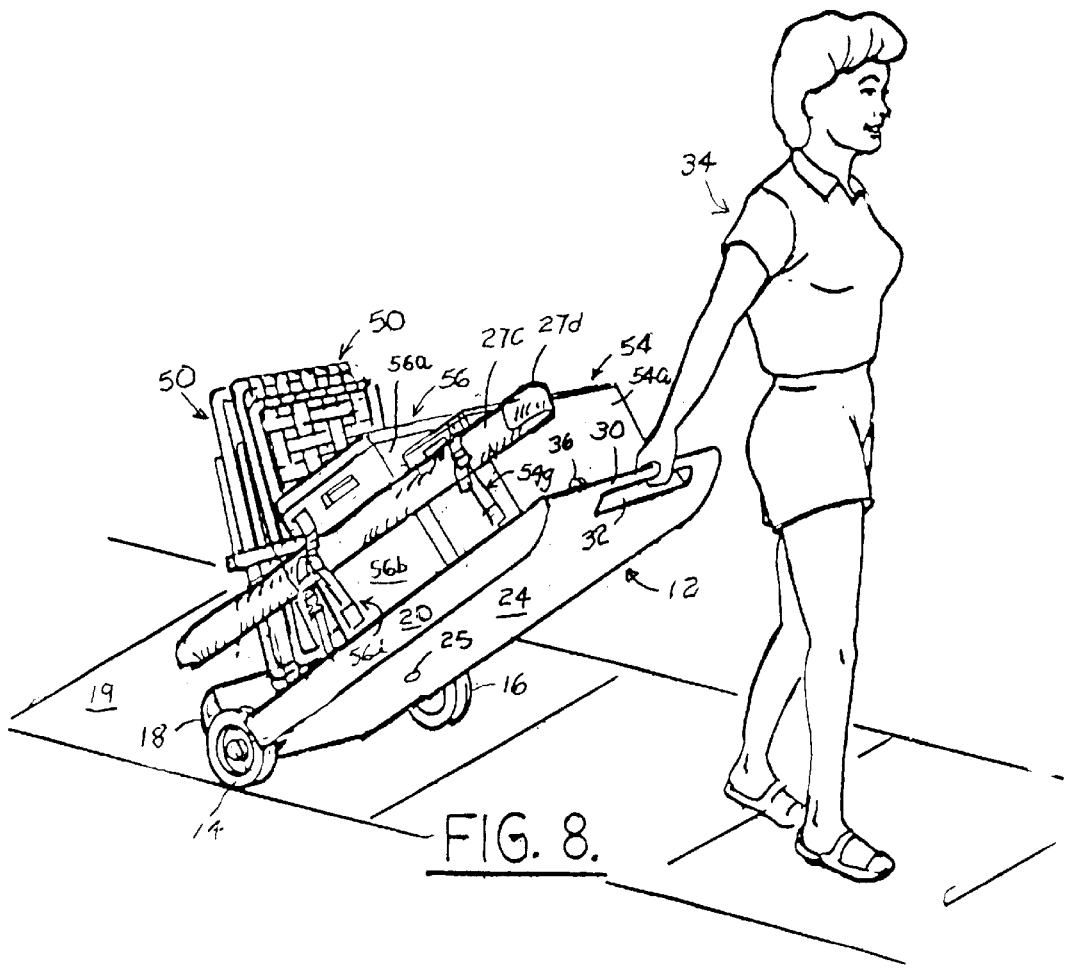
FIG. 8 is a perspective view of the beach carrying device of the invention fully loaded being rolled by a user over a hard flat surface such as a sidewalk.

Wheels 14 and 16 are connected to the rear end 18 of carrier body 12. Wheels 14 and 16 enable carrier body 12 to be towed as shown in FIG. 8 over a hard surface such as sidewalk 19 leading to a beach.

Figure 6:
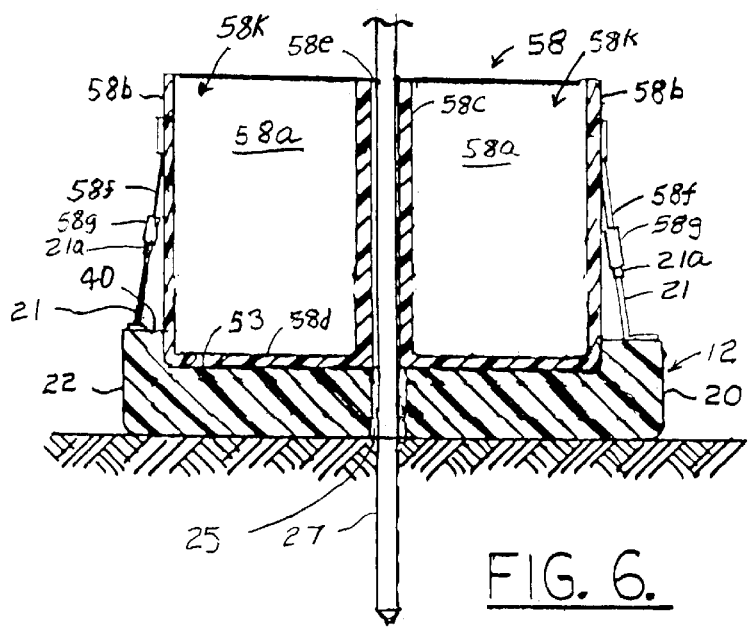
FIG. 6 is a cross sectional view taken along lines 6—6 of FIG. 5.

Carrier body 12 has two perpendicular, parallel sides 20 and 22 extending upwardly from flat generally rectangular bottom 24. As shown in FIGS. 6 and 8, bottom 24 has a cylindrical hole 25 therethrough for receipt of bottom umbrella pole 27. Bottom 24 has an upward sloping or curved portion 28 adjacent to the front end 26 of carrier body 12 which enables carrier body 12 to slide easily over sand 29 as shown in FIG. 10. A handle 30 is formed in the front end 26 of carrier body 12 and has cylindrical opening 32 adjacent thereto formed in carrier body 12 for receipt of the fingers of a hand of an individual user 34 grasping handle 30 as shown in FIG. 8.

As shown in FIGS. 1, 9 and 10, two tow rope brackets 36 and 38 are connected to the top surface 40 of carrier body 12. Tow rope brackets 36 and 38 have holes 36a and 38a, respectively, therein for receipt of snap hooks 42a and 42b connected to each end of tow rope 42. Preferably, tow rope 42 has a hollow cylindrical handle 42c through which tow rope 42 extends for grasping by the user to tow carrier body 12 across a beach as shown in FIG. 10.

Preferably, four cylindrical can or cup holders 44—44 are formed in the top surface 40 of carrier body 12 for supporting beverage cups or cans. Cup holders 44 have a flat bottom 44a parallel to upper surface 40 upon which the bottom of a cup or can may rest. If desired, more or fewer than four cup or can holders 44 may formed in the top surface 40 of carrier body 12.

As shown in detail in FIGS. 1 and 2, located adjacent to the rear end 18 of carrier body 12 are two parallel elongated slots 46—46 for receipt of the bottom horizontal crossmembers 48 of the conventional lawn chairs generally indicated by the numeral 50. Slots 46—46 are aligned perpendicularly to sides 20 and 22 of carrier body 12. Slots 46 are formed between three elongated raised portions 52 which extend upward from the top surface 40 of carrier body 12. If desired, more or fewer than two elongated slots 46—46 may be formed on the top surface 40 of carrier body 12.

Carrier body 12 has a planar central planar recessed portion 53 shown in FIG. 1 for receipt of the storage containers generally indicated by the numerals 54, 56, and 58. Recessed portion 53 is parallel to top surface 40. Recessed portion 53 is surrounded by a plurality of walls 62—62, 64—64, 66, 68—68, 69—69, and 70 which extend perpendicularly upward from recessed portion 53 to top surface 40. Walls 62—62 face each other on opposite sides of recessed portion 53, walls 64—64 face each other on opposite sides of recessed portion 53, walls 68—68 face each other on opposite sides of recessed portion 53, walls 69—69 face each other on opposite edges of recessed portion 53, and wall 70 faces wall 66 on opposite ends of recessed portion 53.

Walls 62—62 are spaced apart a distance sufficient to enable the bottom portion of container 54 to be snugly received therein. Container 54 is preferably box-shaped with two rectangular, parallel sides 54a—54a and 54b—54b with a rectangular lid or top 54c and generally rectangular bottom 54d. Top 54c may be connected to side 54a by a conventional hinge or top 54c may be force fitted onto sides 54a—54a and 54b—54b as known in the art for conventional chest containers to enable movement of top 54 to gain access to the interior of container 54. Container 54 preferably has recessed portion 54f in each of the two sides 54b in which the fingers of the hands of the user may be placed to lift container 54. Preferably container 54 is utilized to store dry goods such as packaged food items or towels, blankets, and the like.

As shown in FIG. 1, container 54 has an elongated horizontal slot 54e in the bottom portion of each of the two sides 54b which is parallel to the bottom 54d of container 54. Slots 54e terminate in the approximate center of sides 54b—54b and are open at the front-facing side 54a. Generally rectangular tabs 60—60 extend horizontally outward toward each other from the top side of opposite walls 62—62 as shown in FIG. 1. Each of the slots 54e—54e engage and receive one of the tabs 60-60 on walls 62—62 of recessed portion 53 to secure container 54 in recessed portion 53 when container 54 is placed in recessed portion 53 and moved toward the front end 26 of carrier body 12 as indicated by the arrow in FIG. 1.

Walls 64—64 are spaced apart a distance to enable the bottom portion of container 56 to be snugly received therein. Container 56 is preferably box-shaped with two generally rectangular, parallel sides 56a—56a and 56b—56b with a rectangular lid or top 56c and generally rectangular bottom 56d. Top 56c may be connected to side 54a by a conventional hinge as shown in FIG. 7 or top 56c may be force fitted onto sides 56a—56a and 56b—56b as known in the art for conventional chest containers to enable movement of top 56 to gain access to the interior of container 56. Container 56 preferably has recessed portion 56f in each of the two sides 56b in which the fingers of the hands of the user may be placed to lift container 56. Preferably container 56 is utilized as a conventional ice chest to store cold goods such as food and beverages, and the like.

As shown in FIG. 1, container 56 has an elongated horizontal slot 56e in the bottom portion of each of the two sides 56b which is parallel to the bottom 56d of container 56. Slots 56e terminate in the approximate center of sides 56b—56b and are open at the front-facing side 56a. Generally rectangular tabs 65—65 extend horizontally outward toward each other from the top side of opposite walls 64—64 as shown in FIG. 1. Each of the slots 56e—56e engage and receive one of the tabs 65—65 on walls 64—64 of recessed portion 53 to secure container 56 in recessed portion 53 when container 56 is placed in recessed portion 53 and moved toward the front end 26 of carrier body 12 as indicated by the arrow in FIG. 1. To enable container 56 to be placed in recessed portion 53, a box-like or parallelepiped shaped recessed portion generally indicated by the numeral 56g having rectangular faces is formed on each bottom corner in the rear-facing side 56a of container 56 to snugly receive walls 68—68 and 69—69 therein and a box-like or parallelepiped shaped recessed portion generally indicated by the numeral 56h having rectangular faces is formed on each bottom corner in the front-facing side 56a of container 56 to snugly receive tabs 65—65 therein to enable container 56 to slide forward to receive tabs 65 in slots 56e.

Figure 5:
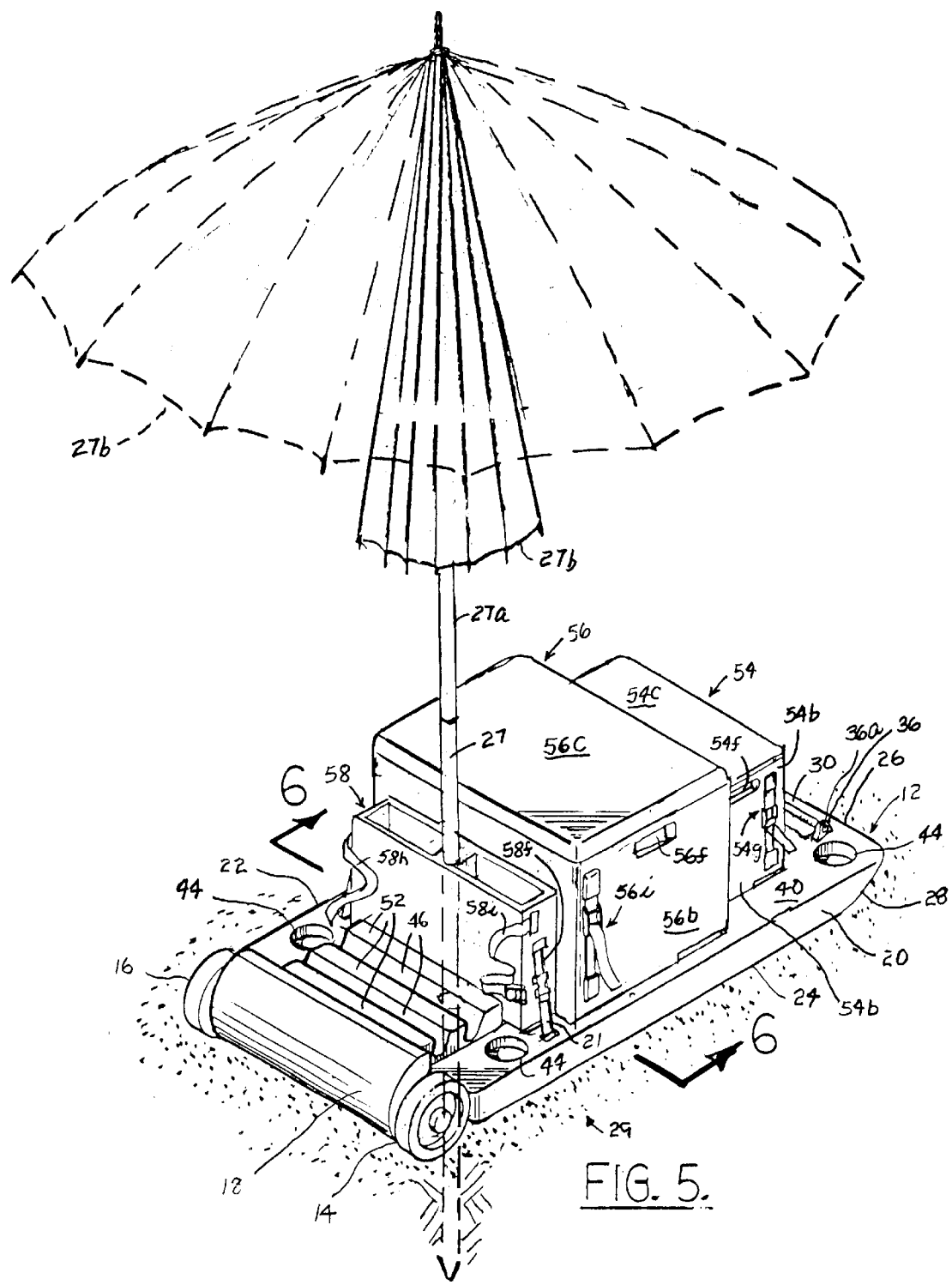
FIG. 5 is a perspective view showing the beach carrying device of the invention placed upon a beach with the umbrella connected thereto, portions of the umbrella being shown in phantom lines to indicate the position of the umbrella when open and to indicate the position of the umbrella when forced into the sand beach upon which the beach carrying device of the invention is placed.

Walls 68—68 are spaced apart a distance to enable the bottom portion of container 58 to be snugly received therein as indicated in FIG. 2. As best shown in FIGS. 2, 5, 6, and 7, container 58 is preferably box-shaped with two generally rectangular, parallel sides 58a—58a and 58b—58b and a rectangular bottom 58d. In the center of container 58 is a divider generally indicated by the numeral 58c. Divider 58c is connected to the inside of parallel sides 58a—58a and separates container 58 into two compartments generally indicated by the numerals 58k—58k. Compartments 58k—58k are open at the top and closed at the bottom by rectangular bottom 58d. Compartments 58k—58k may be use for storing magazines or the like. Divider 58c has a hollow cylindrical sleeve 58e therein which is vertically aligned with hollow cylindrical opening 25 in carrier body 12 for receipt of bottom umbrella pole 27 when container 58 is fastened to carrier body 12 as shown in FIGS. 5 and 6.

As shown in detail in FIG. 6, container 58 is fastened to carrier body 12 by straps 58f—58f connected to sides 58b—58b of container 58 having clasps 58g which can be selectively connected to clasps 21a—21a of strap 21—21 connected to carrier body 12. Container 58 also has straps 58h and 58i connected to the sides 58b—58b thereof for wrapping around lawn chairs 50—50 as shown in FIG. 4 to secure lawn chairs 50—50 to carrier body 12 by placing strap 58h through clasp 58j connected to the end of strap 58i. Preferably container 58 is utilized as a container to transport magazines 59 or books to the beach and to receive and support bottom umbrella pole 27.

As shown in FIG. 7, containers 54 and 58 are preferably sized to both fit inside of container 56 for storage when not in use.

Bottom umbrella pole 27 is slidably connected to central umbrella support pole 27a and umbrella 27b as shown in FIGS. 3 and 5. Umbrella 27b is shown in the open position in phantom lines in FIG. 5. Umbrella 27b preferably has a flexible, hollow cylindrical case 27c which receives bottom umbrella pole 27, central umbrella support pole 27a and umbrella 27b as indicated by the arrow in FIG. 3. Umbrella case 27c has a foldable flap 27d which has a hook and loop material 27e such as Velcro thereon which can be connected to hook and loop material 27f on umbrella case 27c to secure the contents of umbrella case 27c therein. Umbrella case 27c is connected to side 54b of container 54 by the conventional strap and clasp assembly generally indicated by the numeral 54g, and umbrella case 27c is connected to side 56b of container 56 by the conventional strap and clasp assembly generally indicated by the numeral 56i as shown in FIGS. 4, 8, and 10.

Carrier body 12, and containers 54, 56, and 58, are preferably made from a polymeric material commonly referred to as plastic.

Although the preferred embodiments of the invention have been described in detail above, it should be understood that the invention is in no sense limited thereby, and its scope is to be determined by that of the following claims:

1. A carrying device for transporting items over hard surfaces and soft surfaces comprising:
   a. a generally rectangular carrier body having a top surface and a bottom surface, said top surface having two sides, and said top surface having at least two elongated slots extending between said two sides on said top surface of said carrier body for receiving a bottom horizontal member of a conventional lawn chair, said carrier body having a recessed portion in said top surface thereof, said recessed portion having a plurality of tabs extending inwardly therefrom, said carrier body having a flat bottom, said carrier body having a front end and a rear end, said front end having a handle connected thereto for towing said carrier body and said rear end having wheels connected thereto, said carrier body having at least two tow rope brackets attached to said front end of said carrier body for receipt of a tow rope for towing said carrier body, said bottom of said carrier body having an upward sloping portion adjacent to said front end of said carrier body, said carrier body having a generally cylindrical opening therethrough for receipt of an umbrella support pole,
   b. a first storage container adapted for placement in said recessed portion, said first storage container having elongated slots therein for receipt of said tabs in said elongated slots to secure said container to said carrier body,
   c. a second storage container for placement in said recessed portion, said second storage container having a cylindrical sleeve therein for holding an umbrella support pole, said cylindrical sleeve being aligned with said cylindrical opening when said second storage container is placed in said recessed portion, and
   d. at least two wheels connected to said carrier body for rolling said carrier body over hard surfaces.

2. A carrying device for transporting items over hard surfaces and soft surfaces comprising:
   a. a generally rectangular carrier body having a front end, a rear end, and two sides; a top surface, and a generally flat bottom, said carrier body having a recessed portion in said top surface thereof, said recessed portion having a plurality of tabs extending inwardly therefrom, said top surface having an elongated slot extending between said two sides on said top surface of said carrier body for receiving a bottom horizontal member of a conventional lawn chair,
   b. a first storage container for placement in said recessed portion having elongated slots therein for receipt of said tabs in said elongated slots to secure said containers to said carrier body,
   c. a second storage container adapted for placement in said recessed portion having elongated slots therein for receipt of said tabs in said elongated slots to secure said second container to said carrier body,
   d. a third storage container for placement in said recessed portion, said third storage container having a cylindrical sleeve therein for holding an umbrella support pole and fastening straps thereon for connecting said third storage container to said carrier body, said carrier body having a cylindrical opening therein extending through said bottom of said carrier body aligned with said cylindrical opening in said third storage container when said umbrella supporting container is placed in said recessed portion, and
   e. at least two wheels connected to said rear end of said rectangular carrier body for rolling said carrier body over hard surfaces.

3. The carrying device of claim 2 wherein said elongated slot extending between said two sides is located adjacent to said rear end of said carrier body.

4. The carrying device of claim 3 wherein said third storage container has fastening straps thereon for securing lawn chairs thereto.

5. The carrying device of claim 2 wherein said carrier body has a handle on said front end thereof for towing said carrier body over a hard surface.

6. The carrying device assembly of claim 2 wherein said carrier body has at least two tow rope brackets attached to said front end of said carrier body for receipt of a tow rope for towing said carrier body.

7. The carrying device assembly of claim 2 wherein said bottom of said carrier body has an upward sloping portion adjacent to said front end of said carrier body to enable said carrier body to be towed over soft and uneven surfaces.

8. The carrying device assembly of claim 2 wherein said carrier body has a plurality of beverage holders in the top surface thereof.

9. The carrying device assembly of claim 2 wherein said first container and said second container have fastening straps connected thereto for connecting an umbrella thereto.

10. The carrying device of claim 2 wherein said carrier body has a handle on said front end thereof for towing said carrier body over a hard surface, at least two tow rope brackets attached to said front end of said carrier body for receipt of a tow rope for towing said carrier body, and said bottom of said carrier body has an upward sloping portion adjacent to said front end of said carrier body to enable said carrier body to be towed over soft and uneven surfaces.

11. The carrying device of claim 10 wherein said first container and said second container have fastening straps connected thereto for connecting an umbrella thereto.

* * * * *